United States Patent
Miller

(10) Patent No.: US 9,004,237 B2
(45) Date of Patent: Apr. 14, 2015

(54) DISC BRAKE OF HYDRAULIC SELF-ENERGIZING DESIGN WITH FORCE TRANSMISSION UNIT

(71) Applicant: KNORR-BREMSE Systeme fuer Nutzfahrzeuge GmbH, Munich (DE)

(72) Inventor: Bernhard Miller, Weil der Stadt (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 119 days.

(21) Appl. No.: 13/713,780

(22) Filed: Dec. 13, 2012

(65) Prior Publication Data

US 2013/0098715 A1 Apr. 25, 2013

Related U.S. Application Data

(63) Continuation of application No. PCT/EP2011/059818, filed on Jun. 14, 2011.

(30) Foreign Application Priority Data

Jun. 17, 2010 (DE) .................. 10 2010 024 075

(51) Int. Cl.
*F16D 65/56* (2006.01)
*B60T 1/06* (2006.01)
(Continued)

(52) U.S. Cl.
CPC .............. *B60T 1/065* (2013.01); *F16D 65/092* (2013.01); *F16D 65/183* (2013.01); *F16D 65/568* (2013.01); *F16D 65/567* (2013.01);
(Continued)

(58) Field of Classification Search
USPC .................. 188/71.9, 72.1, 72.2, 72.7–72.9, 188/156–162
See application file for complete search history.

(56) References Cited

U.S. PATENT DOCUMENTS

| 7,946,397 B2 | 5/2011 | Miller | |
|---|---|---|---|
| 2013/0098716 A1* | 4/2013 | Miller | 188/71.9 |
| 2013/0112512 A1* | 5/2013 | Miller | 188/72.4 |

FOREIGN PATENT DOCUMENTS

| DE | 10 2006 057 442 A1 | 6/2008 |
|---|---|---|
| DE | 10 2008 061 347 B3 | 4/2010 |
| WO | WO 2007/045430 A1 | 4/2007 |

OTHER PUBLICATIONS

International Search Report dated Sep. 16, 2011 including English-language translation (Four (4) pages).
(Continued)

*Primary Examiner* — Christopher Schwartz
(74) *Attorney, Agent, or Firm* — Crowell & Moring LLP

(57) ABSTRACT

A self-energizing disc brake includes a brake-internal hydraulic arrangement with a supply circuit and an expansion vessel; a brake application device having a cylinder for applying a brake pad toward a brake disc; a force transmission unit supporting the brake pad at a wedge angle on the brake application device; a tangential-force absorbing cylinder for switching over the wedge angle, which is operatively connected to the force transmission unit; an electric-motor actuator for acting on the brake application device via the hydraulic arrangement; and a control unit. The force transmission unit has a deflection lever and a shoulder element attached thereto. Rolling surfaces thereof are in contact with respective corresponding rolling surfaces of a brake application element of the cylinder and a brake pad support device. The deflection lever has a pressure section with a rolling surface in operative connection with the tangential-force absorbing cylinder.

28 Claims, 9 Drawing Sheets

(51) Int. Cl.
  *F16D 65/092*   (2006.01)
  *F16D 65/18*    (2006.01)
  *F16D 121/02*       (2012.01)
  *F16D 121/14*       (2012.01)
  *F16D 125/02*       (2012.01)
  *F16D 125/10*       (2012.01)
  *F16D 125/64*       (2012.01)
  *F16D 127/10*       (2012.01)

(52) U.S. Cl.
  CPC .......... *F16D2121/02* (2013.01); *F16D 2121/14* (2013.01); *F16D 2125/023* (2013.01); *F16D 2125/10* (2013.01); *F16D 2125/64* (2013.01); *F16D 2127/10* (2013.01)

(56) References Cited

OTHER PUBLICATIONS

International Preliminary Report on Patentability (PCT/IB/338 & PCT/IB/373), including Written Opinion (PCT/ISA/237) dated Jan. 3, 2013 (seven (7) pages).

\* cited by examiner

DISC BRAKE OF HYDRAULIC SELF-ENERGIZING DESIGN WITH FORCE TRANSMISSION UNIT

CROSS-REFERENCE TO RELATED APPLICATIONS

This application is a continuation of PCT International Application No. PCT/EP2011/059818, filed Jun. 14, 2011, which claims priority under 35 U.S.C. §119 from German Patent Application No. DE 10 2010 024 075.3, filed Jun. 17, 2010, the entire disclosures of which are herein expressly incorporated by reference.

This application contains subject matter related to U.S. application Ser. No. 13/713,273, entitled "Disc Brake of Hydraulic Self-Energizing Design With Parking Brake Device," and U.S. application Ser. No. 13/713,791, entitled "Disc Brake of Hydraulic Self-Energizing Design With Adjusting Device," both filed on even date herewith.

BACKGROUND AND SUMMARY OF THE INVENTION

The invention relates to a disc brake of hydraulic self-energizing design with a force transmission unit.

A disc brake with an electromotive actuator of self-energizing design and with a brake-internal hydraulic arrangement is described in the Applicant's application WO 2007/045430 A1.

Such a disc brake consists of a considerable number of parts and is associated with corresponding costs.

It is the object of the present invention to improve a generic disc brake.

It is thereby possible to realize a disc brake which permits the construction of a compact disc brake with a smaller number of parts than in the prior art.

According to the invention, the disc brake is equipped with at least one force transmission unit which has a diverting lever and a shoulder element attached thereto. The diverting lever and the shoulder element have rolling surfaces which are in contact with respective corresponding rolling surfaces of a brake-application element of the at least one brake-application cylinder and of a support device of the brake pad. The diverting lever has a thrust portion with a rolling surface which is operatively connected to the at least one tangential force absorption cylinder.

Therefore, in a simple manner, a disc brake having a force transmission unit is provided which has an element for transmitting brake-application forces and an element for transmitting tangential forces, wherein as a result of the design of rolling surfaces which are in contact, friction losses are reduced and robustness is increased.

A self-energizing disc brake includes the following: a brake-internal hydraulic arrangement with a reservoir circuit and an expansion vessel; a brake-application device having at least one brake-application cylinder for the brake-application movement of at least one brake pad in the direction of a brake disc; at least one force transmission unit which supports the at least one brake pad on the brake-application device at a wedge angle; at least one tangential force absorption cylinder for wedge angle switching, which tangential force absorption cylinder is operatively connected to the at least one force transmission unit; an electromotive actuator which acts on the brake-application device via the hydraulic arrangement; and a control unit which is provided for controlling the wedge angle switching between the tangential force absorption cylinder and the electromotive actuator. At least one force transmission unit has a diverting lever and a shoulder element attached thereto, wherein the diverting lever and the shoulder element have rolling surfaces which are in contact with respective corresponding rolling surfaces of a brake-application element of the at least one brake-application cylinder and of a support device of the brake pad, and further wherein the diverting lever has a pressure portion with a rolling surface which is operatively connected to the at least one tangential force absorption cylinder.

In the case of two or more brake-application cylinders, a distributor cylinder for pressure boosting may be arranged in series between the electromotive actuator and the brake-application device. This also offers the advantage that it compensates oblique wear of the brake pads and reduces a pressure level between the tangential absorption cylinder and the distributor cylinder.

A particularly large reduction of friction in the interacting functional units is attained in that the diverting lever has a tooth portion which is provided for interacting with a tooth counterpart of the brake-application element. The tooth contour is selected such that the toothing behaves, on both sides, in the manner of two gearwheels running into one another. This means that the same low-friction processes as those encountered during the rolling of tooth flanks on one another arise.

The tooth counterpart may be a separate component for attaching to the at least one brake-application element. In this way, a machining process for creating the toothing can be performed separately on a corresponding machine.

The support device may also be formed with a portion produced for example as a tooth. Between the support device and a force transfer portion of the lever and a shoulder connected thereto there may be arranged a roller element which rolls on the surface.

It is preferable for the shoulder of the diverting lever to have a planar surface and for the support portion of the support device, in particular in the form of a tooth, to have a curved surface. Combinations are however also possible: the shoulder of the diverting lever may have a planar or curved surface, wherein the support portion of the support device likewise has a curved or planar surface.

The curvatures of the surfaces may be calculated so as to correspond exactly harmonically to rolling movements on the support device.

A pitch point, at which sliding-free rolling takes place, between the at least one force transmission unit, the at least one brake-application cylinder and the support device of the brake pad may be selected so as to be situated at one third of a maximum tangential deflection of the brake pad. There is therefore no relative displacement, for example between tooth and counterpart contour, at one third of the maximum deflection. This is advantageous because, in the frequency distribution of brake-application movements, the greatest number of brake actuations takes place with one third of the maximum deflection, that is to say with one third of a maximum brake-application force, whereas a maximum brake-application force is encountered relatively rarely.

Such a pitch point may self-evidently also be provided in the embodiment in which the diverting lever has the tooth portion which is provided for interacting with the tooth counterpart of the brake-application element.

The shoulder element may be connected to the diverting lever by way of a resilient plate-spring screw connection. It is ensured in this way that, even in the case of broadened production tolerances, no slippage with increased friction arises during a rolling process.

The shoulder element may have portions for brake-application force transmission for interacting with the at least one brake-application cylinder and the support device of the brake pad. The portions may be provided with rolling surfaces, whereby friction is reduced. Furthermore, a splitting-up of forces is made possible, wherein the shoulder element preferably transmits brake-application forces and the diverting lever transmits tangential forces.

In one embodiment, the shoulder element may have a narrowed portion for generating a small degree of elasticity. Rolling without slipping is permitted in this way.

The shoulder element has freedom of movement relative to the diverting lever, which advantageously simultaneously permits a slippage-free rolling movement of the vertical brake-application force by way of the shoulder element and of the horizontal braking force by way of the roller element.

The disc brake may furthermore include a readjustment device for readjustment of brake pad wear, wherein the readjustment device has an adjustable screw spindle, which is operatively connected to the brake-application device for the purpose of generating a follow-up movement of the at least one brake pad and can be coupled to the electromotive actuator in order to be driven, and a readjustment piston, which can be hydraulically adjusted in the tangential force absorption cylinder during a follow-up movement of the at least one brake pad.

In a further embodiment, it is provided that the control unit is connected to the reservoir circuit and to an intermediate circuit, wherein the electromotive actuator is connected to the reservoir circuit by way of a suction valve and can be connected to the intermediate circuit by way of a switching valve when the latter is in a first position.

It may be the case here that, in the first position of the switching valve, a change in a brake application movement can be performed only through adjustment of the electromotive actuator. The control unit may be designed, in interaction with a stepped absorption piston of the tangential force absorption cylinder, to select an effective wedge angle closest to a present friction coefficient of the brake pad.

It is particularly advantageous here that the brake force can be increased or reduced only through an adjustment of a control disc, which may for example be in the form of a perforated disc. Here, the control disc can selectively connect pressure chambers, which are connected to the stepped absorption piston of the tangential force absorption cylinder, to the reservoir circuit and/or to the intermediate circuit.

A particular graduation of wedge angles is made possible in that the selective connection of the pressure chambers to the reservoir circuit and/or to the intermediate circuit can be switched, based on the operating principle of binary coding, in seven stages with increasing effective piston surface area of the stepped absorption piston.

The electromotive actuator can be connected to the hydraulic control drive of the control unit, in order to switch the selective connections for the purpose of selecting a shallower or steeper wedge angle, by use of the switching valve when the latter is in a second position. Here, the electromotive actuator performs an additional function and saves space. During switching, it is, for example, possible for a pump suction line of the actuator to be blocked with a pump pressure line. A change in a brake-application position is then not possible during the short switching process.

It may advantageously also be provided that, to save power during relatively long, uniform braking operations, despite a pressure difference existing across the electromotive actuator, the electric motor thereof can be switched into a deenergized state by virtue of the switching valve being switched from the first position into the second position.

In order that a presently selected brake-application position remains unchanged, the control unit may have further switching positions, such that between each of the selective connections or each of the possible switchable wedge angles, there exists a blocking position in which the pressure chambers and connections to the reservoir circuit and/or to the intermediate circuit are shut off.

The electromotive drive is operatively connected only to the control drive of the control unit for the entire duration of a braking operation.

In a further embodiment, it may be provided that, during a period in which a brake-application position is constant, the perforated or control disc is in a blocking position situated between a wedge angle more supercritical in relation to the present wedge angle and a wedge angle more subcritical, and that in this position, the electromotive actuator is deenergized.

In the event of a demand for a slightly more intense brake application by way of the electromotive actuator and the control drive, the perforated or control disc may be adjustable such that the perforated or control disc is adjusted, in the manner of operation of a proportional valve, from the blocking position slowly in the direction of the position of a supercritical wedge angle. In the event of a contrary demand, the perforated or control disc is, in a similar manner, adjusted from the blocking position slowly in the direction of the position of a subcritical wedge angle.

Furthermore, for the purpose of a fast release of the brake, for example in the event of a fault or in the event of a failure of the supply voltage of the brake, the brake-internal hydraulic arrangement may have a release valve, which generates a through-connection in the deenergized state, for an immediate and reliable release of the brake.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
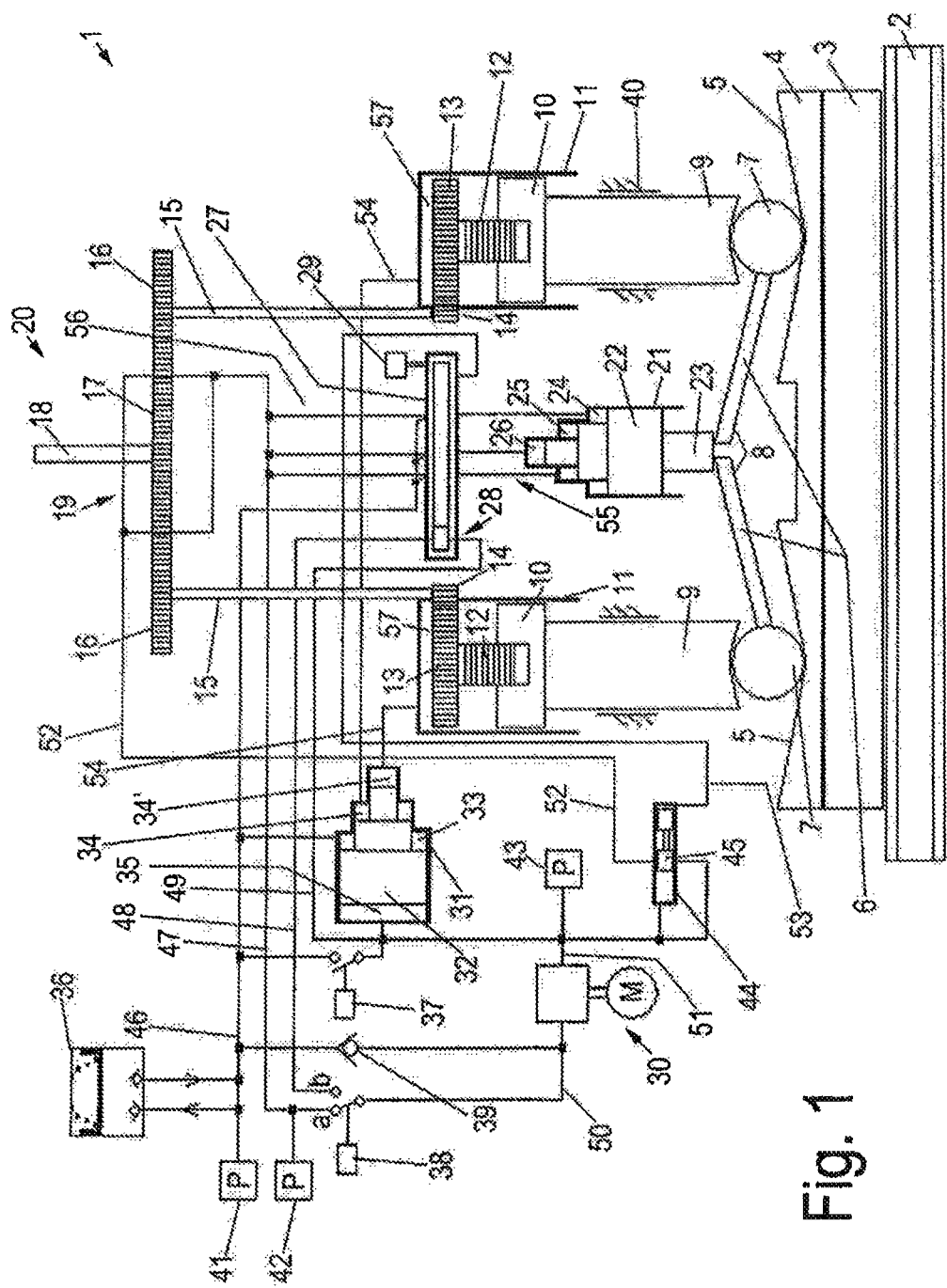
FIG. 1 is a schematic illustration of a first exemplary embodiment of a disc brake according to the invention.

Components of identical or similar function are denoted by the same reference numerals unless stated otherwise.

Here, the expression "oil" refers to hydraulic fluid.

Figure 2:
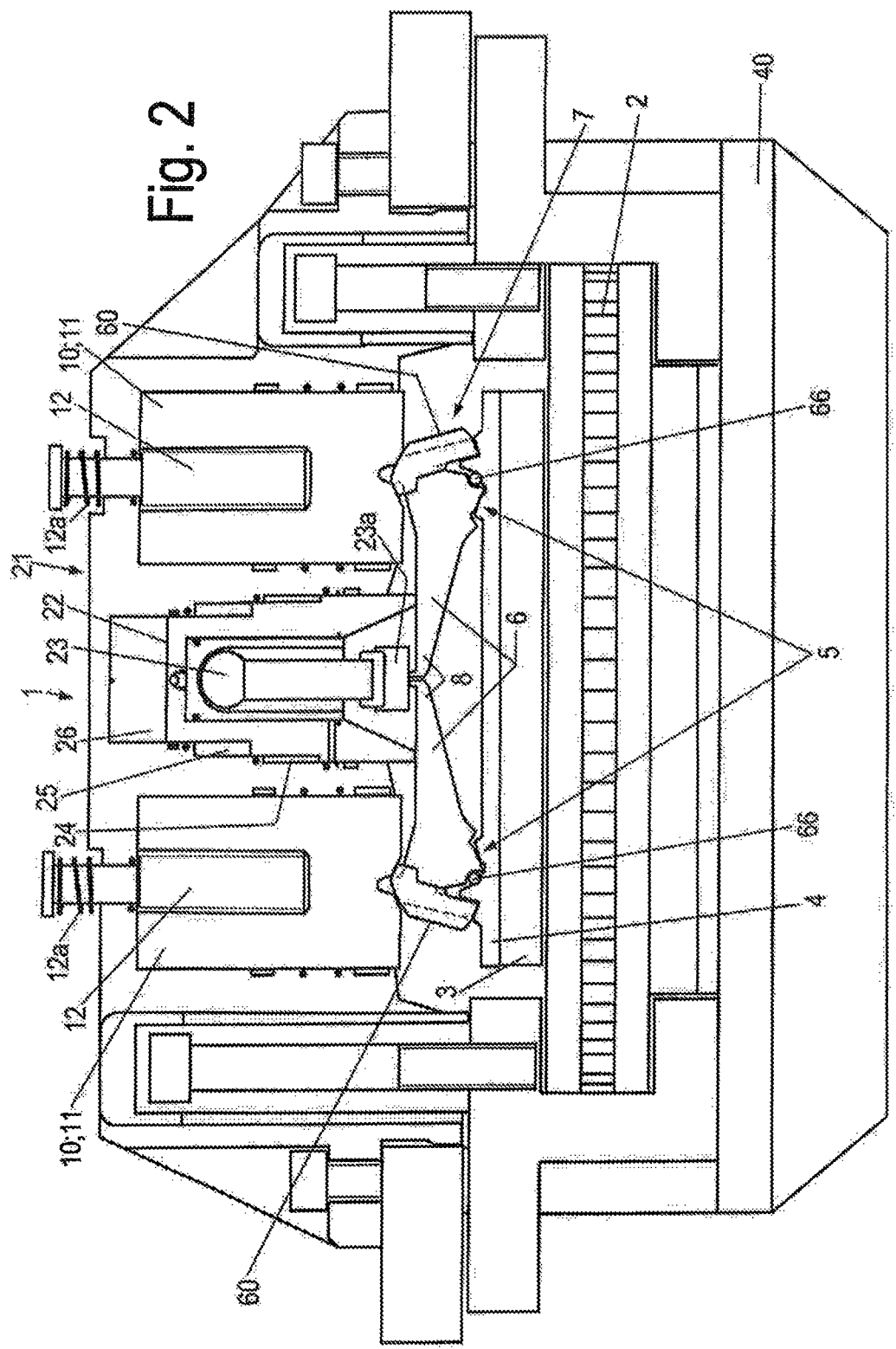
FIG. 2 is a schematic, partially sectional illustration of a second exemplary embodiment of the disc brake according to the invention in a normal position.
Figure 3:
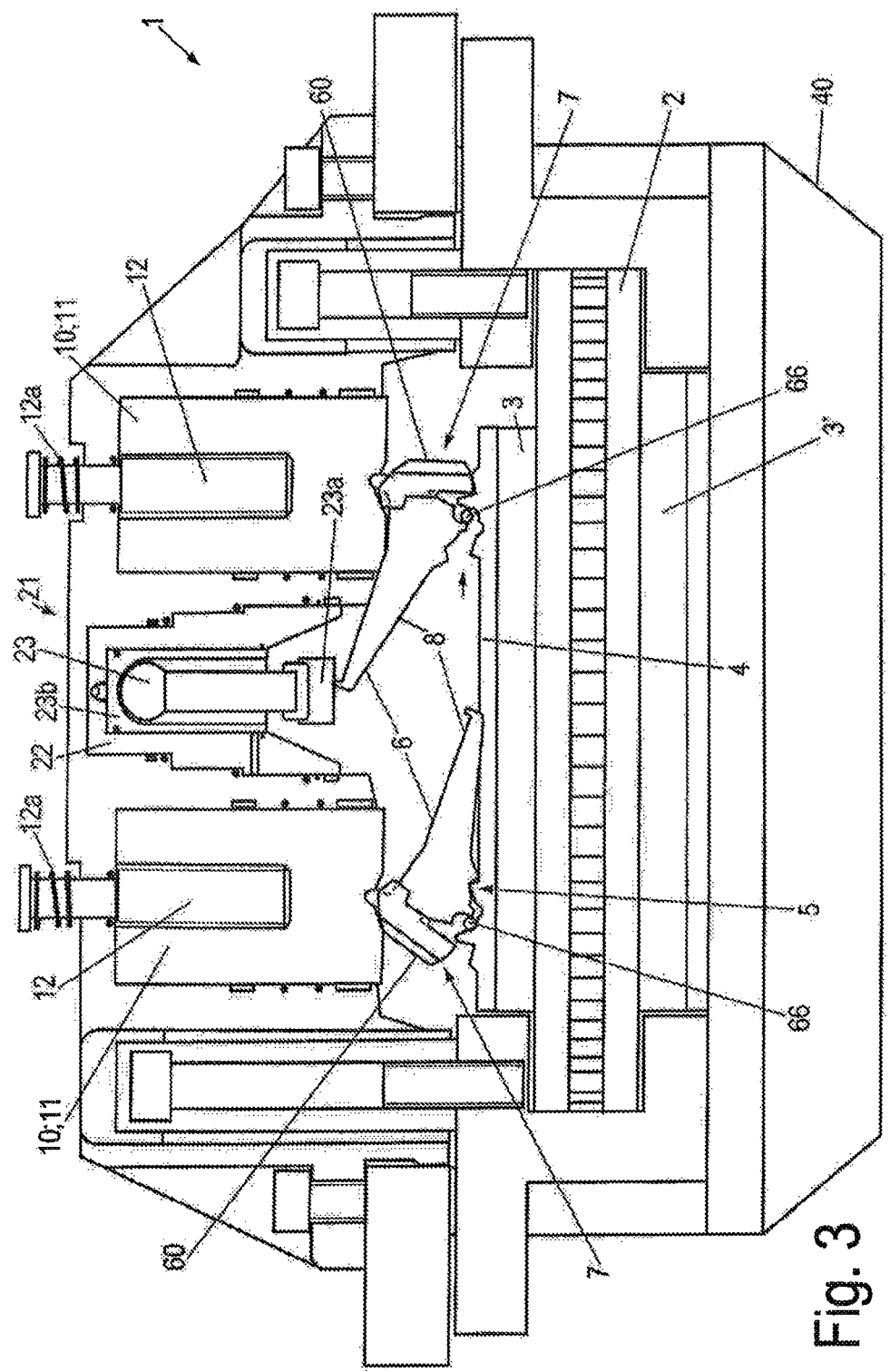
FIG. 3 is a schematic, partially sectional illustration of the second exemplary embodiment as per FIG. 2 in a position of maximum brake application.

FIG. 1 is a schematic illustration of a first exemplary embodiment of a disc brake 1 according to the invention. FIG. 1 will be described in conjunction with FIG. 2 and FIG. 3. FIG. 2 is a schematic, partially sectional illustration of a second exemplary embodiment of the disc brake according to the invention in a normal position, and FIG. 3 is a schematic, partially sectional illustration of the second exemplary embodiment as per FIG. 2 in a position of maximum brake application.

The disc brake 1 has a brake caliper 40 which engages over a brake disc 2. At both sides of the brake disc 2 there is arranged in each case one brake pad 3, 3' with brake pad carrier 4, wherein the brake pad 3' shown at the bottom in FIG. 2 (and not illustrated in FIG. 1) bears against the brake caliper 40, and the other brake pad 3 is operatively connected to a brake-application device. The axis of the brake disc 2 is not shown and runs, as is readily understood, vertically upward below the plane of the drawing. A forward movement of a vehicle to which the disc brake 1 is assigned is intended to run from right to left in FIGS. 1 to 3, wherein the brake disc 2 then rotates counterclockwise.

Here, the pad carrier 4 is formed with two wedge-shaped support devices 5, wherein the support devices are supported at a wedge angle on the brake-application device, with which the support devices are operatively connected in each case by way of a force transmission unit 7 to, in each case, one brake-application element 9. The brake-application elements 9 are connected at their top end in each case to a brake-application piston 10 of a brake-application cylinder 11. The brake-application cylinders 11 are arranged adjacent to one another such that the brake pads 3, 3' can be pressed uniformly against the brake disc 2 during a brake application.

A screw spindle 12 with a thread is screwed into the brake-application piston 10 in each case in the longitudinal direction. The screw spindles 12 are each provided, on the top ends thereof, with a screw spindle wheel 13, wherein each screw spindle wheel 13 engages with a readjustment pinion 14. The readjustment pinions 14 are in each case rotationally conjointly connected by way of readjustment shafts 15 to readjustment shaft wheels 16 which jointly engage with a readjustment drive wheel 17. The readjustment shaft wheel 16 and the readjustment drive wheel 17 are formed, for example, as a hydraulically operated gear motor 19, and in this case are equipped with an emergency release device 18 which can be adjusted for example by use of a tool in order to actuate the readjustment drive wheel 17. The readjustment wheels 13, 14, 16 and 17 have toothings, for example, and are used for wear-compensating readjustment of the brake pads 3, 3', as will be explained in more detail further below. The readjustment wheels 13, 14, 16 and 17, the emergency release device 18, the readjustment shafts 15 and the gear motor 19 form, together with the screw spindles 12, a readjustment device 20 of the disc brake 1. Alternatively, the readjustment shaft 15 may be identical to the respective screw spindle 12, such that the gearwheel's screw spindle wheel 13 and readjustment pinion 14 are dispensed with, wherein the two readjustment shaft wheels 16 have a slightly larger outer diameter, while at the same time the readjustment drive wheel 17 has a smaller outer diameter.

Return springs 12a are arranged in each case between the brake caliper 40 and screw spindles 12 in the longitudinal direction of the screw spindles 12 and, in the normal position shown in FIG. 2, pull the brake pad 3, 3' back from the brake disc 2 to generate a certain so-called air play. Further springs (not illustrated) are provided for holding the brake-application piston 10 and brake pad 3 together.

The force transmission units 7 have, in each case, a diverting lever 6, wherein the diverting levers 6 are situated opposite one another and thrust portions 8 are operatively connected to a plunger 23 of a tangential force absorption cylinder 21. Here, the plunger 23 is part of a stepped absorption piston 22 which, together with the tangential force absorption cylinder 21, defines first to third pressure chambers 24, 25 and 26. In a preferred embodiment (FIGS. 2 to 4), the force transmission units 7 include in each case, a shoulder element 60 and a roller element 66. These will be described and explained in detail further below.

The pressure chambers 24, 25 and 26 are connected in each case via intermediate lines 55 to a control unit 27 which is a constituent part of a hydraulic system of the disc brake 1. The hydraulic system will now be explained in more detail on the basis of FIG. 1.

An electromotive actuator 30, for example an electric motor with a gearwheel pump, is connected to a reservoir circuit 46 via a pump suction line 50 with a suction valve 39, for example a directional valve. The reservoir circuit 46 is hydraulically connected at one side to an expansion vessel 36 and to a first pressure sensor 41. At the other side, the reservoir circuit 46 can be connected by way of a release valve 37 to a pump pressure line 51 of the electromotive actuator 30. Furthermore, the reservoir circuit 46 is connected to the control unit 27 and to an admission pressure chamber 33 of a distributor cylinder 31.

The reservoir circuit 46 is, for example, charged with a reservoir pressure of approximately 1 to 4 bar.

The electromotive actuator 30 is furthermore connected via the pump pressure line 51 to an inlet pressure chamber 35 of the distributor cylinder 31 and to a hydraulic switch 44. Also connected to the pump pressure line 51 is a control drive pressure line 49 which leads to a control drive 28 of the control unit 27. A control drive return line 48 is connected between the control drive 28 and a second position b of a switching valve 38. Here, a closed, that is to say first position a of the switching valve 38 connects the pump suction line 50 to an intermediate circuit 47 which is connected to the control unit 27 via connecting lines 56. Furthermore, the intermediate circuit 47 is connected to the gear motor 19 of the readjustment device 20, wherein a gear motor pressure line 52 connects the gear motor 19 at the pressure side to the hydraulic switch 44. The hydraulic switch 44 is furthermore connected via a hydraulic switch control line 53 to the control unit 27.

The control unit 27 is, for example, a plate-like, rotatable control disc with control bores which perform different functions of the disc brake 1 in different operating states and perform control tasks. The control disc is for example coupled to a hydraulic gear motor as control drive 28. The control disc is furthermore operatively connected to a control transmitter 29 which detects, and transmits to a control unit, the rotational angle position of the control disc. A superordinate, for example electronic brake control unit (not shown) controls and regulates the braking processes and states of the disc brake 1. For this purpose, the brake control unit controls the valves 37 and 38, which are for example electromagnetic valves, and the electromotive actuator 30. The control unit also communicates with the first pressure sensor 41 and with further pressure sensors, of which a second pressure sensor 42 determines a pressure in the intermediate circuit 46. A third pressure sensor 43 serves for determining a pressure in the pump pressure line 51, wherein the pressure in the sensors 42, 43 may be up to 130 bar.

The control disc may, in one embodiment, have eight switching positions in order to permit a selection of seven different wedge angles.

In a second embodiment, there is situated between each of the eight switching positions a position in which all of the connecting lines 55 of the stepped absorption piston 22 are shut off. An activation of the braking force is thus possible merely by use of a switch between supercritical and subcritical wedge angles. As a result of the possibility of a proportional adjustment of the switching cross sections and a blocking position between each of the eight switching positions, it is possible to increase or reduce the brake force merely by rotating the control disc.

The distributor cylinder 31 has a stepped piston 32 for pressure boosting, synchronization and uniform loading of the brake-application cylinder 11 with a brake-application pressure of up to approximately 350 bar. For this purpose, the stepped piston 32 forms, together with the brake-application cylinder 11, high-pressure chambers 34, 34' which are connected in each case via a high-pressure line 54 to the brake-application cylinders 11.

In the initial position of the piston (left-hand stop), both pressure chambers 34, 34' are connected to the admission pressure chamber by virtue of the stepped piston 32 being designed to be slightly shorter than the cylinder chamber 31. In this way, the two brake-application pistons 10 can be hydraulically newly balanced in their rest position (pulled back against the stop). At the same time, this serves to return excess oil from the brake-application cylinders 11 into the expansion vessel 36 in the event of a pad change, when the brake-application pistons 10 are fully retracted again.

The expansion vessel 36 may be designed as a form of exchangeable cartridge, similarly to presently commercially available oil filters in motor vehicle engines. A fast exchange of the hydraulic oil is thus possible.

Since the filtering-out of dirt particles is of high importance for the durability of the oil in any hydraulic system, the cartridge-like compensation vessel may be equipped with an oil filter. It is expedient for this purpose for the connecting line to the expansion vessel to be composed of two individual lines which are each equipped with a directional throughflow valve. By arranging the two backflow preventers so as to have antiparallel flow directions, it is possible to force a situation in which, during every change in volume of the expansion vessel, any oil flowing in and/or out is conducted through the oil filter. The oil filter may also be jointly exchanged during an exchange of the cartridge-like expansion vessel.

The disc brake 1 is a hydraulic, self-energizing disc brake, the function of which will now be explained.

Upon the start of a braking operation, hydraulic fluid is sucked out of the reservoir circuit 46 and out of the expansion vessel 36 via the suction valve 39 by way of the electromotive actuator 30. Here, the electromotive actuator 30 increases the pressure in the pump pressure line 51, as a result of which the stepped piston 32 of the distributor cylinder 31 is adjusted and the brake-application cylinder 11 is charged with pressure. The brake pads 3, 3' are thus pressed by the brake-application elements 9, via the force-transmission units 7, against the brake disc 2 until a self-energizing process is initiated.

Here, the brake pad 3 is displaced to the left in FIG. 3, against a stop of the brake caliper 40, owing to friction. As a result of the horizontal or tangential mechanical deflection of the brake pad 3, owing to a supercritical mechanical wedge angle of the support device 5, one of the two diverting levers 6 moves upward. The left-hand force transmission unit 7, as diverting lever 6, is pivoted downward, and the right-hand force transmission unit 7, as the other diverting lever 6, is pivoted upward. The diverting levers 6 are pivoted by the tangential force thus generated. The right-hand diverting lever 6 diverts the tangential force into a vertical force which is transmitted, via the thrust portion 8 of the diverting lever, to the plunger 23 of the tangential force absorption cylinder 21. Here, a thrust plate 23a serves for a friction-free transmission of force by virtue of the top edge of the diverting lever 6 rolling, with linear contact, on the underside of the thrust plate 23a. At the same time, the thrust plate 23a rolls, on the top side thereof and likewise with linear contact offset horizontally through approximately 90°, with respect to the plunger. The brake pad which moves spatially horizontally during a braking operation can thus transmit its vertical force without friction to the stepped absorption piston.

The braking forces are transmitted via the two force transmission units 7. On the right-hand side, the braking forces are introduced into the brake caliper 40 by way of the brake-application cylinder 11. On the left-hand side, the diverting lever 6, with its portion arranged between the brake-application element 9 and the support device 5, transmits the brake-application force of the left-hand brake-application cylinder 11 and also, as a result of its rolling surfaces which run parallel but obliquely, a part of the braking forces. On the right-hand side, the transmission of the brake-application force of the right-hand brake-application cylinder 11 is performed by a shoulder element 60 of the right-hand force transmission unit 7. If the vehicle (not shown) travels backward, the above-described process is reversed, as is easily comprehensible, and the left-hand diverting lever 6 transmits the tangential force to the tangential force absorption cylinder 21. A detailed description of the transmission of brake-application forces and tangential forces by the force transmission units will be given further below in conjunction with FIGS. 7 to 10.

Here, the control disc of the control unit 27 is set by way of the control drive 28 such that the pressure chambers 24, 25 and 26 of the tangential force absorption cylinder 21 can be connected in seven different combinations either to the reservoir circuit 46 and/or to the intermediate circuit 47, which is connected by way of the switching valve 38 to the pump suction line 50. It is thus possible for the disc brake 1 to be adapted to a present friction coefficient. Different so-called wedge angles can be set by virtue of the effective surface areas of the three pressure chambers 24, 25, 26 being formed preferably in the ratio 2:1 (and thus 1/7, 2/7, 4, 7). By binary combination of the active surface areas, it is possible to produce seven different sizes of effective surface areas of the stepped piston 22. Measurement values for the determination of the present friction coefficient are provided by the pressure sensors 42, 43 taking into consideration the respectively active pressure chambers 24, 25, 26 and further parameters, for example from a vehicle controller. The tangential force absorption cylinder 21 thus delivers a pressure which, to boost the pressure in the pump pressure line 51, acts on the brake-application cylinder 11 via the distributor cylinder 31 and thus minimizes the pumping power of the electromotive actuator 30. The distributor cylinder 31 may, together with the two brake-application cylinders 11, synchronize the brake-application movement thereof, compensate oblique wear of the brake pads 3, 3', and lower a pressure level between the tangential absorption cylinder 21 and the distributor cylinder 31 in the intermediate circuit 47. Here, the distributor cylinder 31 serves as a pressure booster for the brake-application cylinder 11.

At the end of the braking process, the electromotive actuator 30 is deactivated, and the release valve 37 is activated. As a result, the pressure in the pump pressure line 51 is dissipated, wherein with falling brake-application pressure in the brake-application cylinders 11, the return springs 12a return the brake pad 3 again into its normal position with air play.

The release valve 37 may also be used, in the event of a fault, as an emergency release valve for releasing the disc brake 1. The release valve is, for example, a solenoid valve which is open in the deenergized state.

The expansion vessel 36 furthermore serves for receiving the volumes of the pressure chambers 24, 25, 26, which are connected to the reservoir circuit 46 by way of the control unit 27, of the tangential force absorption cylinder 21. The expansion vessel 36 also has sensors for determining the respectively present oil quantity. The expansion vessel thus has sensors for detecting pad wear of the brake pads 3, 3', the present horizontal displacement of the brake pad 3 as a result of braking, and hydraulic fluid losses.

In the event of wear being detected in this way, at a certain wear value, the switching valve 38 is switched by the brake control unit into position b, and the electromotive actuator 30 is activated. Here, the control drive return line 48 is connected to the pump suction line 50, and the hydraulic gear motor 28 of the control unit 27 adjusts the control disc such that, via the hydraulic switch control line 53, a slide 45 of the hydraulic switch 44 is displaced into an open position, for example, by the pressure acting on the hydraulic switch of the pump pressure line 51 connected to the hydraulic switch. The open position of the slide 45 then connects the pump pressure line 51 to the gear motor pressure line 52 and exerts the pressure on the gear motor 19 of the readjustment device 20. The readjustment wheels 16, 17 thus rotate the screw spindles 12 via the gearwheels 16, 14, 13 in a synchronous adjustment movement, whereby the brake-application elements 9 of the brake-application cylinders 11 are adjusted in the direction of the brake disc 2 and readjust the determined wear travel of the brake pad 3 or 3' until the air play of the normal state is re-established. Various sensors, for example angle sensors on the gear motor 19, may serve for the precise measurement of the readjustment travel. The sensor may, for example, be a multi-turn potentiometer, the electrical resistance of which varies proportionally with respect to the readjustment travel over a rotational angle which is proportional to the readjustment travel, and thus provides a measure for the readjustment travel.

The electric drive 30 may also be used as a measurement variable of the adjustment, because the electric drive often already has a rotational angle sensor for the control thereof, wherein the rotational angle can thus be used as an adjustment measurement variable if the slippage of the two gearwheel drives 19, 30 is negligible.

The readjustment process is ended, when the normal air play is reached, in that, by way of the switching valve 38, the control drive 28 is actuated for the deactivation of the hydraulic switch 44 by way of the hydraulic switch control line 53, as a result of which the gear motor 19 is deactivated, and then the electromotive actuator 30 is deactivated.

Figure 4:
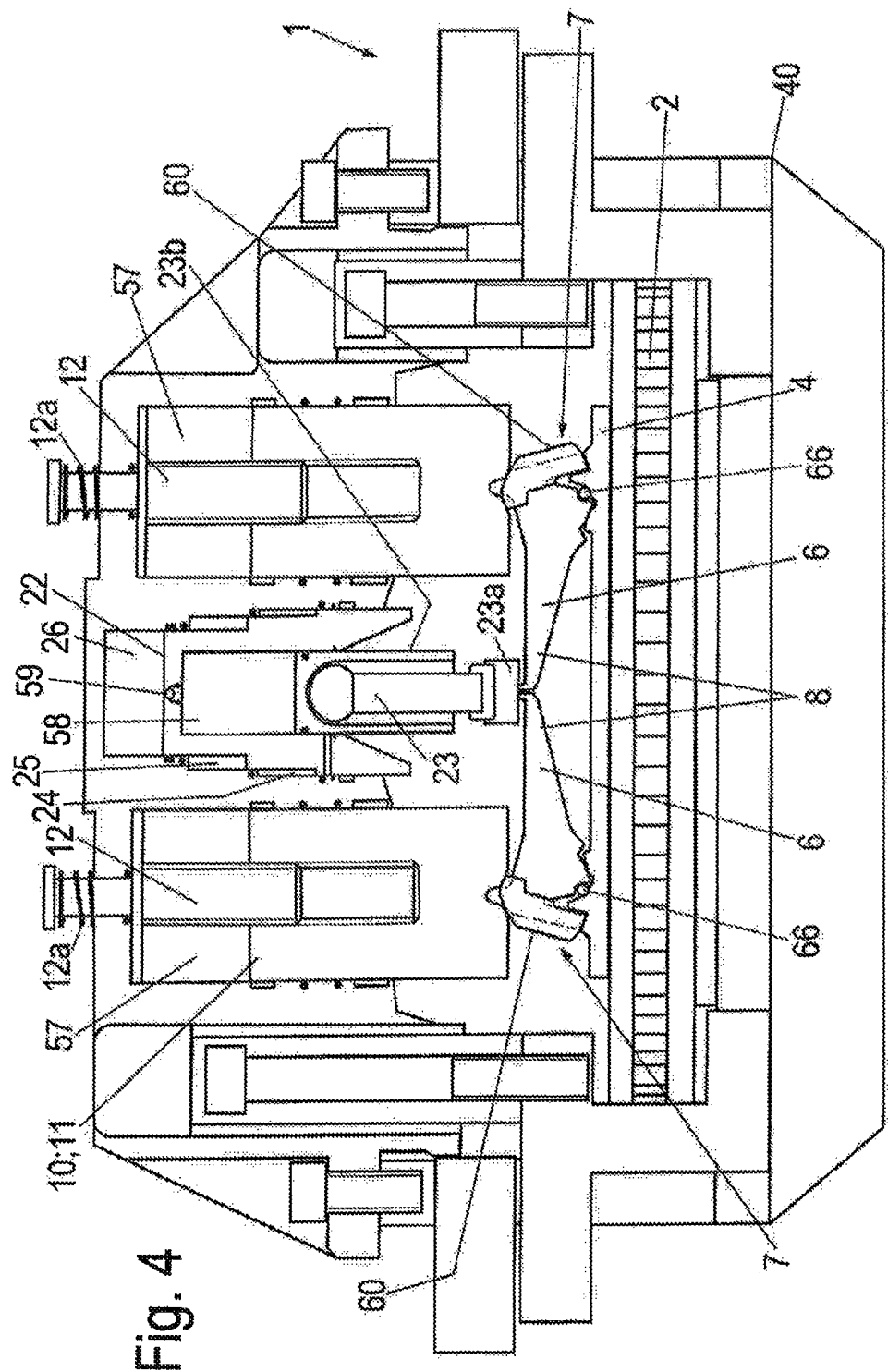
FIG. 4 is a schematic, partially sectional illustration of the second exemplary embodiment as per FIG. 2 in a normal position with maximum brake wear.

FIG. 4 is a schematic, partially sectional illustration of the second exemplary embodiment as per FIG. 2 in a normal position with maximum brake wear of the brake pads 3, 3'. It can be clearly seen that the brake-application pistons 10 have been adjusted in the brake-application cylinders 11 downward in the direction of the brake disc 2 by the screwed-out screw spindles 12. Here, brake-application pressure chambers 57 of the brake-application cylinders 11 are subsequently filled with hydraulic fluid in order to compensate the readjustment travel. This may take place by way of the reservoir circuit 46 and furthermore via the admission pressure chamber 33, which in turn are connected to the high-pressure chambers 34, 34'. The stepped piston 32 is for this purpose in a rest position (left-hand stop). The process also ensures a continuous, slow follow-up flow of new oil over the time period of pad wear. Here, relatively old oil may accumulate in the brake-application chambers 57. Furthermore, the wear-compensating readjustment of the brake pad 3 has the result that the diverting levers 6 are likewise adjusted, with their thrust portions 8, by the readjustment travel. Without compensation of the readjustment travel, a function of the tangential force absorption cylinder 21 would not be possible over the entire readjustment travel. For this purpose, the stepped absorption piston 22 of the tangential force absorption cylinder 21 is provided with a readjustment piston 23b, which is arranged, between the plunger 23 and the stepped absorption piston 22, in the stepped absorption piston so as to be displaceable coaxially with respect thereto. The readjustment piston 23b is situated in the stepped absorption piston 22 and forms with the latter a readjustment chamber 58 which communicates via a directional valve 59 with the third pressure chamber 26 of the tangential force absorption cylinder 21.

The readjustment of the readjustment piston 23b likewise takes place by way of the reservoir circuit 46, in that the pressure chambers 24 to 26 are filled from the reservoir circuit 46 by use of the control unit 27. After the stepped absorption piston 22 has reached its outer stop, the readjustment chamber 58 is also filled via the directional valve 59 until the readjustment piston 23b is stopped by the two diverting levers 6 via the plunger 23. The pressure in the reservoir circuit 46 must be adequate for this purpose. The pressure may, however, also be increased by way of additional pressure-increasing measures by way of the electromotive actuator 30 using additional valves and regulating means, wherein the readjustment travel of the readjustment piston 23b may be detected by the measurement of the residual volume in the expansion vessel 36 or by other suitable sensors. If force is now introduced into the readjustment piston 23b via the plunger 23 during a braking process, the hydraulic fluid in the readjustment chamber 58 cannot escape owing to the directional valve 59. In the event of a pad change and resetting of the readjustment device 20, the readjustment chamber 58 is likewise evacuated, which may be realized, for example, by opening the directional valve 59 by use of a suitable tool or by way of a pin positioned centrally in the base of the pressure chamber 26. This will be explained below.

A readjustment of the pad wear takes place in each case after the release of the immobilizing brake or parking brake. The working chamber of the cylinder of the stepped absorption piston 22, that is to say the pressure chambers 24, 25 and 26, permits a slightly greater movement travel than the diverting levers 6 require at their maximum deflection. The readjustment pistons 23b can thus adjust themselves automatically. To deploy the piston 23b, additional oil is admitted through the directional valve 59 as backflow preventer into the cylinder chamber (readjustment chamber 58) above the readjustment piston 23b. This occurs when, by way of spindles 12, the brake-application pistons 10 have been adjusted further in the direction of the brake disc 2 (owing to pad wear) after the end of the parking brake or handbrake actuation. The stepped absorption piston 22 thereby abuts against its outer movement stop. The hydraulic pressure in the readjustment piston 23b, that is to say in the readjustment chamber 58, falls, such that the directional valve 59 opens and oil flows into the readjustment chamber 58.

The reversed retraction of the readjustment piston 23b takes place during an exchange of the brake pads 3, 3' and/or of the brake disc 2. For this purpose, the spindles 12 are hydraulically actuated by the gear motor 19 such that the brake-application pistons 10 are retracted. The stepped absorption piston 22 is thereby also retracted. The hydraulic oil above the brake-application pistons 10 and above the stepped absorption piston 22 is forced into the expansion vessel 36. Here, the stepped absorption piston 22 is retracted until the piston base surface thereof makes contact with the cylinder chamber base of the third pressure chamber 26. Shortly before the contact point, a pin (not illustrated but easily conceivable) which is positioned centrally in the base of the third pressure chamber 26 presses against the directional valve 59, such that the latter opens and the oil situated in the readjustment chamber 58 is forced via the third pressure chamber 26 and onward via the high-pressure chambers 34, 34' and the admission pressure chamber 33 into the expansion vessel 36. Position regulation for the stepped absorption piston 22 is thus realized in a simple manner, such that the stepped absorption piston, despite occasional pad wear-compensating readjustment, can follow the movement profile of the diverting lever without being hindered by its mechanical stops.

Figure 5:
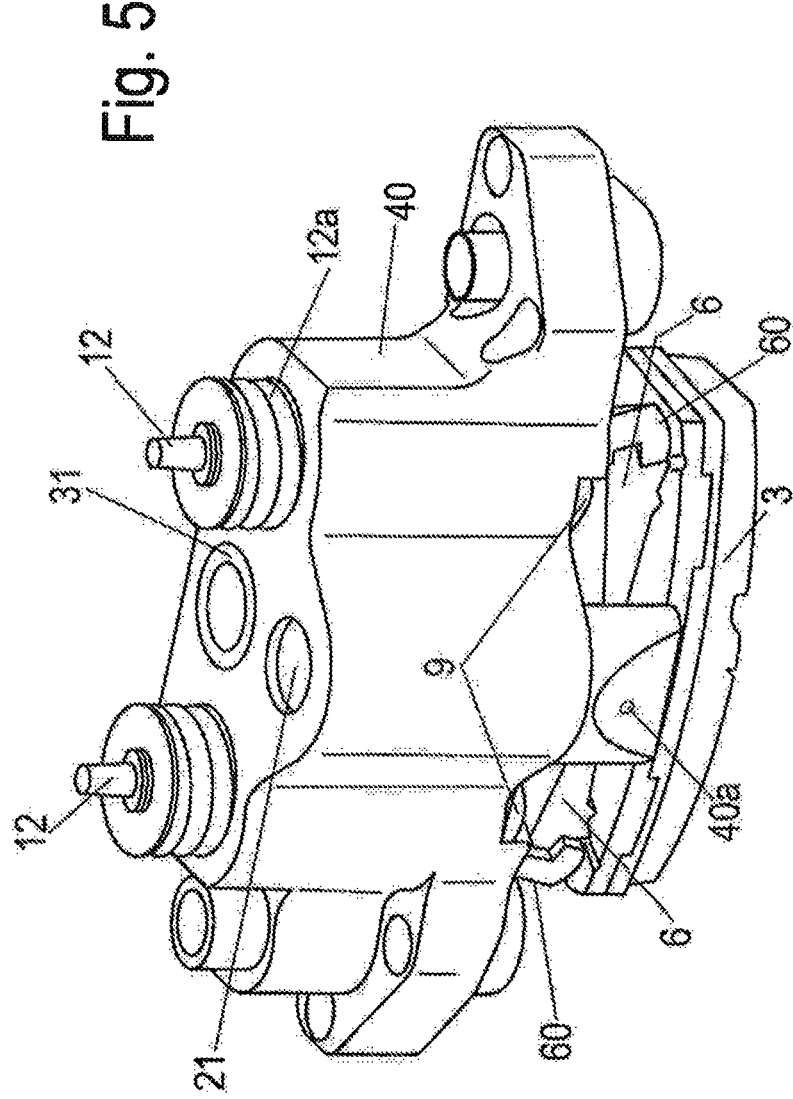
FIG. 5 shows a schematic, perspective view of the second exemplary embodiment as per FIG. 2.
Figure 6:
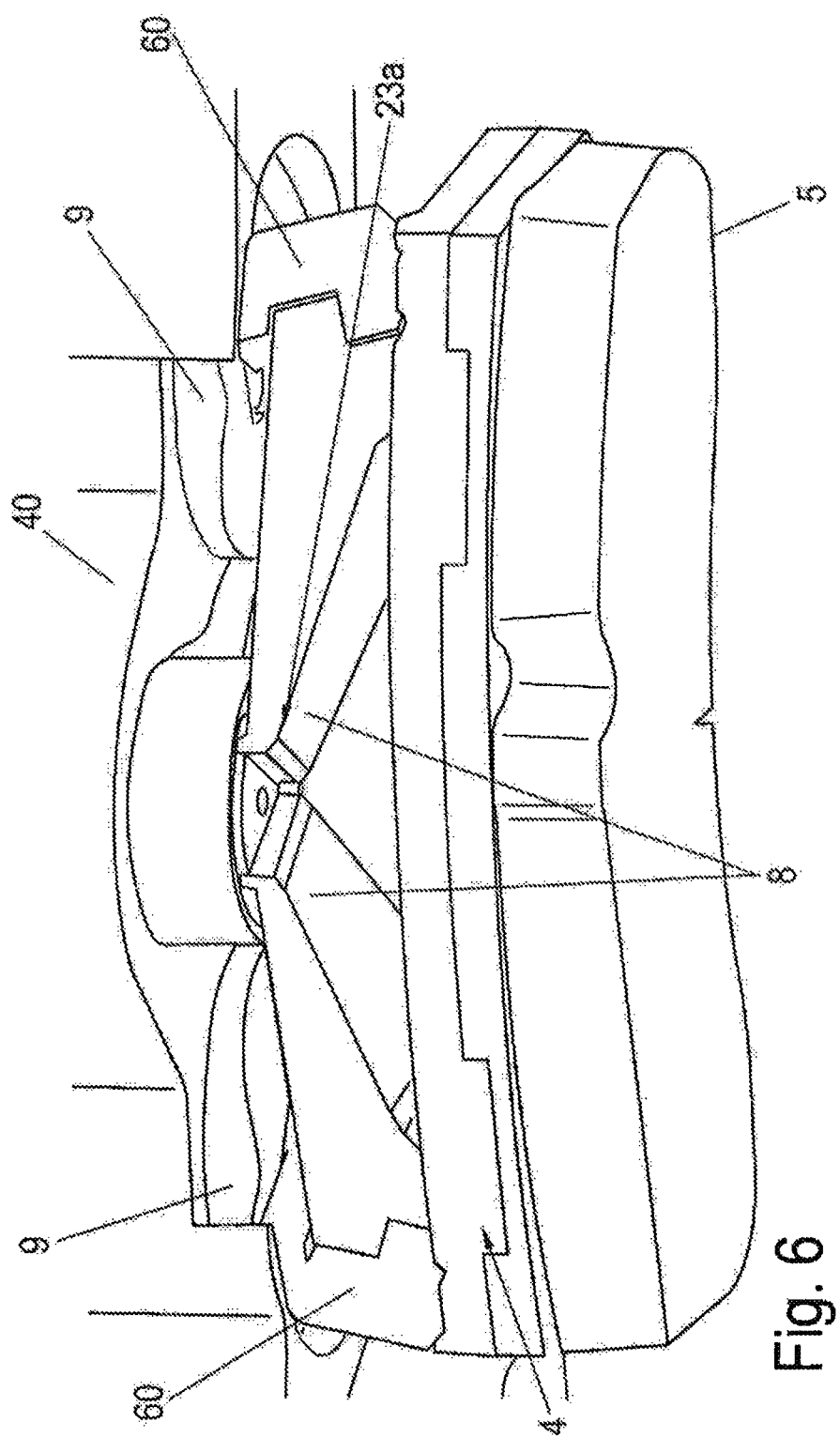
FIG. 6 shows a schematic, perspective view of a detail from FIG. 5.

FIG. 5 shows a schematic perspective view of the second exemplary embodiment as per FIG. 2, and FIG. 6 shows a schematic perspective view of a detail from FIG. 5.

FIG. 5 shows a portion of a brake caliper 40 in which, in this case, all of the hydraulic components are arranged. Between the brake-application cylinders 11, of which in this case the upper ends of the screw spindles 12 with the return springs 12a are visible, the tangential force absorption cylinder 21 and the distributor cylinder 31 are arranged one behind the other, wherein the cylinders 11, 21 and 13 are substantially all situated parallel to one another. In the lower region, illustrated from another perspective in FIG. 6, a stop element 40a is arranged, between the brake caliper 40 and pad carrier 4, below the tangential force absorption cylinder 21. Whereas the stop element 40a is situated on the outer side below the stepped piston 22, a spring for holding together the brake-application piston 10 and brake pad 3 may also be positioned on the inner side below the distributor cylinder 31. The brake pad 3 is of circular-arc-shaped form corresponding to the brake disc 2, wherein the diverting levers 6 with the shoulder elements 60 are arranged between piston elements 9 and the support device 5, and the thrust portions 8 point radially outward and bear against the thrust plate 23a.

Figure 7:
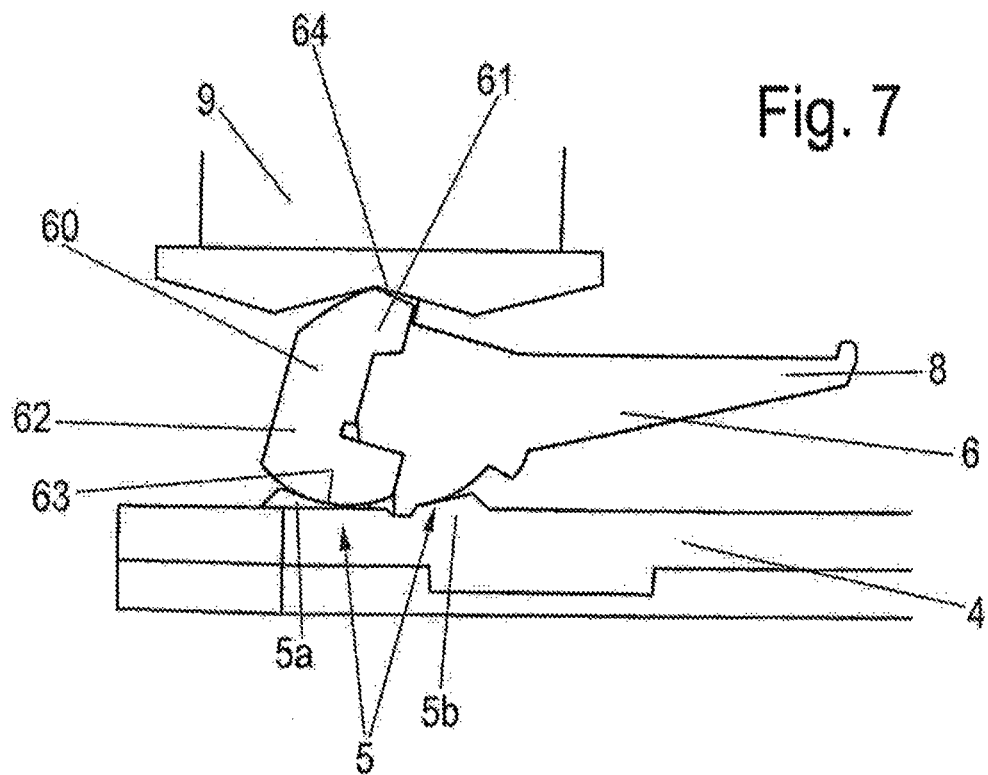
FIG. 7 shows a schematic side view of an exemplary embodiment of a force transmission unit according to the invention.

FIG. 7 shows a schematic side view of an exemplary embodiment of a diverting lever 6 according to the invention. The second diverting lever 6 situated on the right-hand side is not shown but is easily conceivable on the basis of the preceding figures.

Figure 8:
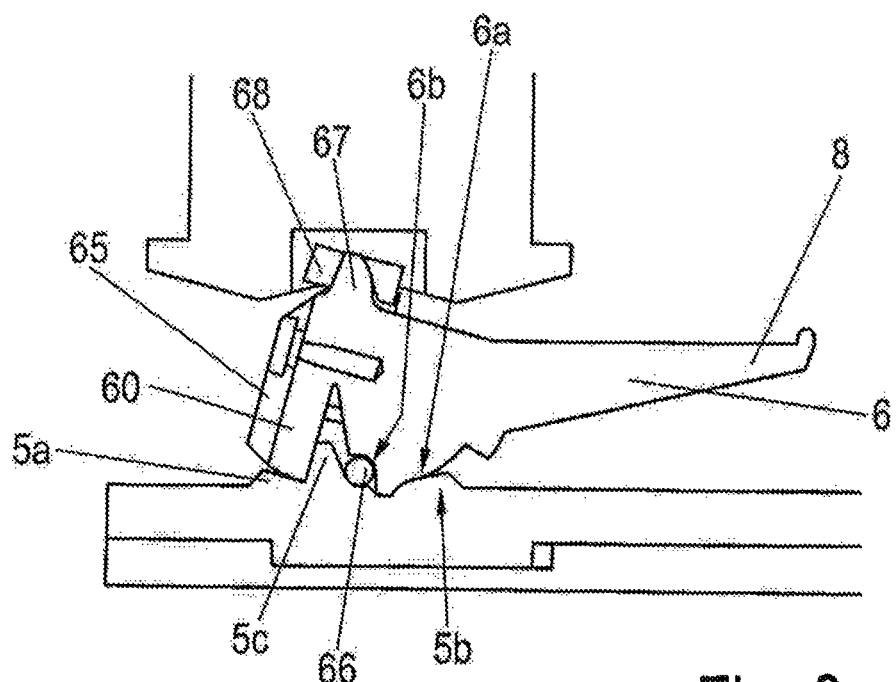
FIG. 8 shows a schematic, longitudinal sectional view of the force transmission unit according to the invention as per FIG. 7.

As already described above, the force-transmission unit 7 has a diverting lever 6 and a shoulder element 60. The shoulder element 60 is connected to the diverting lever 6 on that side thereof which is situated opposite the thrust portion 8, in this example resiliently by way of a loosely screwed plate spring connection in the longitudinal direction of the diverting lever 6, that is to say from left to right as can be seen in FIG. 8. The shoulder element 60 is arranged between the brake-application element 9 and the pad carrier 4 of the brake pad 3 (see also FIGS. 2 to 6). The shoulder element has, on its top side, a shoulder portion for brake-application force introduction 61. The shoulder portion is provided with a rolling surface for brake-application force introduction. The curved rolling surface makes linear contact with a corresponding planar rolling surface 64 on the underside of the brake-application element 9. The brake-application force thus introduced by the brake-application element 9 into the shoulder element 60 (in the vertical direction in FIG. 7) is transmitted by a shoulder portion for brake-application force transmission 62 of the shoulder element 60 into the lower portion of the shoulder element. On the underside of the shoulder element 60, a likewise curved rolling surface is formed in a planar shoulder portion for brake-application force transfer 63. The lower rolling surface of the shoulder portion for brake-application force transfer 63 is in contact with a first support portion 5a of the support device 5 and transmits the brake-application force into the support device 5 and thus into the brake pad 3. The first support portion 5a forms a rolling surface which corresponds to the rolling surface of the shoulder portion for brake-application force transfer 63. The shoulder portions 62, 63, 64 extend substantially perpendicular to the plane of the drawing of FIG. 7, as can be clearly seen from FIGS. 9 and 10. In this way, the shoulder element 60 serves for transmitting brake-application forces even when the brake pad 3 has been deflected in the tangential direction during the braking process. Here, the rolling surfaces of the shoulder portions 61 and 63 roll on the rolling surfaces 64 and 5a which correspond therewith in each case, in the manner of a cylindrical body between two parallel surfaces. As a result of the loosely screwed plate spring connection, it can be ensured that, even in the case of broadened production tolerances, no slippage occurs during the rolling.

The shoulder element 60 has freedom of movement relative to the diverting lever 6. A slippage-free rolling movement of the vertical brake-application force by way of the shoulder element 60 and of the horizontal braking force by way of a roller element 66 are thus simultaneously made possible (see FIG. 8).

The support device 5 has a second support portion 5b which is in contact with a force transfer portion 6a of the diverting lever 6. In this regard, FIG. 8 shows a schematic, longitudinal sectional view of the force transmission unit 7 according to the invention as per FIG. 7.

FIG. 8 shows a central region of the force transmission unit 7 in longitudinal section. In this regard, FIG. 10 with the associated description serves for further orientation.

The diverting lever 6 is in contact, at the underside thereof, with the second support portion 5b via the force transfer portion 6a. Between the first support portion 5a and the second support portion 5b, the support device 5 is formed with a support portion for tangential force 5c. The support portion for tangential force 5c is of tooth-like form and, like the support portions 5a and 5b, extends perpendicular to the plane of the drawing. Between the tooth-like support portion for tangential force 5c and a rear shoulder 6b of the force transfer portion 6a of the diverting lever 6 is arranged the roller element 66, preferably a cylindrical roller, the longitudinal axis of which also extends perpendicular to the plane of the drawing. On the rear upper side thereof, the diverting lever 6 is formed, above a fastening portion for the shoulder element 60, with a tooth portion 67 which is in contact with a corresponding tooth counterpart 68 in the brake-application element 9. The shoulder element 60 is attached with a shoulder central portion 65 to the rear side of the diverting lever by way of the plate spring connection specified above.

The diverting lever 6 transmits tangential forces in the region of engagement with the second support portion 5a, in the region of engagement with the support portion for tangential force 5c via the roller element 66, and in the region of engagement with the tooth counterpart 68. The tangential forces are also referred to as horizontal braking forces. The forces cause the diverting lever 6, as described above, to pivot and transmit the tangential forces via its thrust portion 8 to the tangential force absorption cylinder 21 via the thrust plate 23a. The roller element 66 transmits tangential forces from the tooth-like support portion for tangential force 5c to the rear shoulder 6b of the force transfer portion 6a of the diverting lever 6, wherein the rear shoulder 6b may have a specially curved surface for the rolling of the roller element. The curvature on the support portion for tangential force 5c (and on the rear shoulder 6b of the diverting lever 6, if present) is calculated so as to correspond exactly harmoniously with the rolling movement on the support device 5 (5c, 5b). In this way, a transmission of braking and brake-application forces is possible with low friction.

The braking forces are transmitted via the tooth portion 67 of the diverting lever 6 from the diverting lever 6 to the brake-application cylinder 11, from which the braking forces are in turn dissipated into the brake caliper 40. Here, only braking forces which exceed the braking forces of the mechanical basic wedge angle must be dissipated to the housing via the tooth portion 67 and the roller element 66. The braking forces which correspond to the mechanical wedge angle are transmitted via the oblique rolling surfaces of the support device 5 directly from the pad carrier 4 into the two brake-application elements 9 via the force transmission unit 7.

The tooth contour of the tooth portion 67 and of the tooth counterpart 68 is selected such that these roll on one another in the manner of gearwheels. Here, the pitch point at which sliding-free rolling takes place is selected so as to be situated at one third of a maximum deflection. This means that, at one third of the maximum deflection, no frictional relative displacement between the tooth portion 67 and the tooth counterpart 68 takes place. This selection is made because, in the frequency distribution of brake-application movements, the greatest number of brake actuations takes place with one third of the maximum brake-application force, whereas a maximum brake-application force is encountered relatively rarely.

The shoulder element 60 for transmitting the brake-application forces has an intensely narrowed portion in order thereby to generate a certain small degree of elasticity, such that the rolling process takes place without slippage.

The transmission of the braking forces from the diverting lever 6 via the thrust portion 8 into the thrust plate 23a and into the plunger 23 of the tangential force absorption cylinder 21 takes place exclusively by way of rolling movements.

Figure 9:
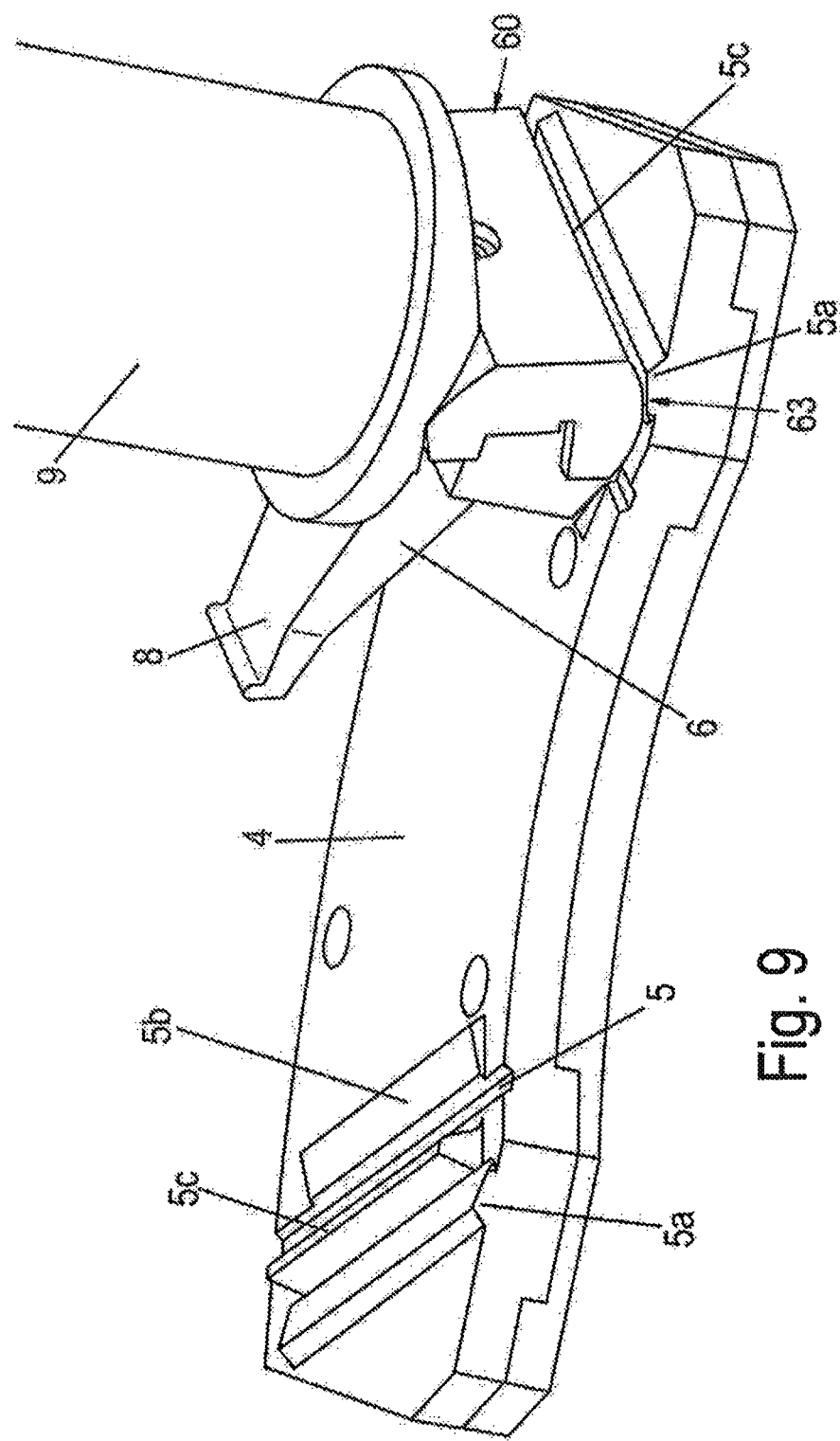
FIG. 9 shows a schematic, perspective view of a brake pad with the force transmission unit according to the invention.

FIG. 9 shows a schematic perspective view of a brake pad 3 with the force transmission unit 7 according to the invention, the force transmission unit being shown in this case only on the right-hand side between the brake-application element 9 and the support device 5 (that on the left-hand side is easily conceivable). The support device 5 of the pad carrier 4 is shown on the left-hand side with the portions 5a, 5b and 5c, which extend rectilinearly radially with respect to a brake disc (not shown). Extending in the same radial direction is the shoulder element 60, in the central region of which is shown an opening which serves for receiving the above-mentioned plate spring connection for fastening the shoulder element 60 to the diverting lever 6. Shown on the underside of the shoulder element 60, the shoulder portion for brake-application force transfer 63 is in contact with the first support portion for brake-application force 5a. The contact of the support portion for tangential force 5c is hidden on the right-hand side by the shoulder element 60.

Since the lines of contact of the two rolling planes of the support device 5 are arranged in each case perpendicular to the circular movement of the brake disc 2, the brake pad 3, during its horizontal displacement, follows approximately the circular movement of the brake disc 2. As a result, the transverse forces on the two force transmission units 7 are minimized, while at the same time optimum utilization of the area of the brake pad 3 on the brake disc 2 is made possible.

A further advantage of the arrangement consists in that the movement profile of the brake pad 3 is virtually identical to the circular movement of the brake disc 2.

Furthermore, it can be seen in FIG. 9 that the thrust portion 8 of the diverting lever 6 is provided with a rolling surface.

Figure 10:
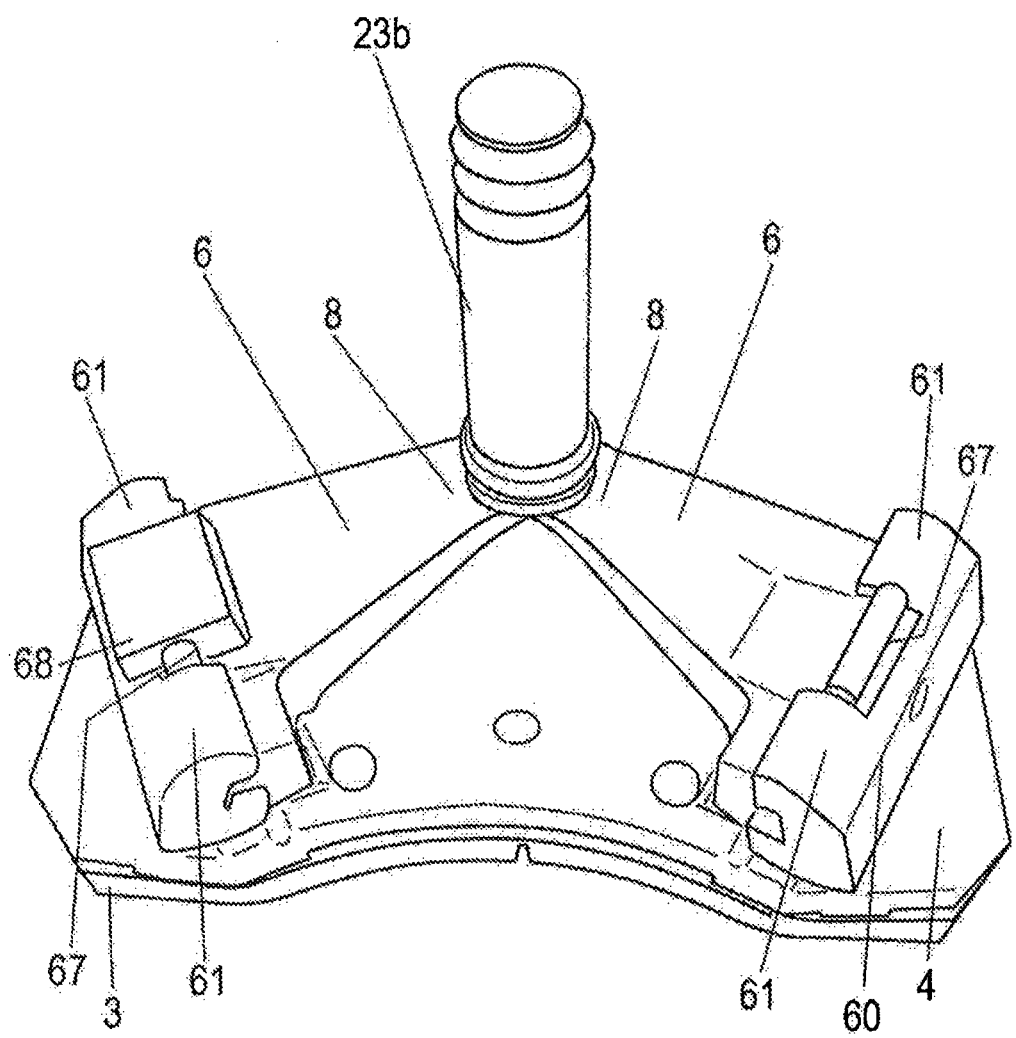
FIG. 10 shows a further perspective view of a brake pad with two force transmission units according to the invention and with a readjustment piston.

Finally, FIG. 10 illustrates a further perspective view of a brake pad 3 with brake carrier 4 having two force transmission units 7 according to the invention and having a readjustment piston 23b which, with its underside (thrust plate 23a not visible), makes contact with the thrust portions 8 of the diverting levers 6. The diverting levers 6 pivot in each case about radially arranged pivot axes, wherein the radial arrangement relates to a brake disc (not shown). The diverting levers 6 are arranged substantially at right angles to the radial pivot axis, wherein the width and height of the diverting levers become smaller toward the thrust portion 8.

The shoulder elements 60 have, at both sides of a central portion, in each case one of two shoulder portions for brake-application force introduction 61. The tooth portion 67 of the respective diverting lever 6 is situated in each case centrally between the shoulder portions. On the left-hand side, the tooth counterpart 68, in this case in the form of a cuboidal piece, is shown in contact with the left-hand tooth portion 67. The tooth counterpart 68 may, as shown here, be produced as a separate part and subsequently inserted into the underside of the brake-application element 9.

The disc brake 1 according to the invention thus has the following characteristics and advantages:

Electromotive Drive;

Low electrical actuation power (for example approximately 60 W to a maximum of 150 W);

High energy density and force density (180 kN brake-application force can be realized in the structural space);

Automatic self-energization in both directions of travel;

Simple and reliable emergency release function as a result of normally-open magnetic valve (release valve 37);

Hydraulic force transmission by means of brake fluid;

Hydraulic components are a reliable and known standard technology;

Good sliding and lubricating properties of the components as a result of the use of oil;

Compact, lightweight design;

Inexpensive gearwheel pump instead of expensive mechanical heavy-duty gearing;

Shorter braking travel as a result of improved ABS regulation (small masses to be accelerated);

Short response and adjustment time (small masses to be accelerated together with simultaneously high self-energization action);

Intelligent wear-compensating readjustment for rear-side pads without additional motor;

One electric motor drives, via the gearwheel pump, the brake application, the drive of the control unit (valve disc), the readjustment device, and the parking brake (self-energizing, purely mechanical and active in both directions of travel, reliable release of the locked brake);

Simple and precise force measurement by means of pressure sensors;

Insensitive to vibrations;

Robust regulation as a result of being free from play, no mechanical gearwheel pairings for braking force transmission;

Three-stage switching (stepped piston) permits seven different wedge angles;

Direct measurement of the brake-application force and of the braking force possible;

Precise measurement or detection of the contact point/biting point of the brake pads by differential pressure measurement; and Measurement of the pad wear without additional wear travel sensors, wherein a travel sensor of a liquid level in the expansion vessel can advantageously be used for measurement of the horizontal adjustment of the brake pads, detection of hydraulic fluid losses, and determination of the brake pad wear status.

Even though the present invention has been described above on the basis of preferred exemplary embodiments, it is not restricted thereto, but rather may be modified in a variety of ways.

The design of the diverting lever 6 may differ from the form shown.

The control unit 27 may also have magnetic valves instead of or in addition to a control disc.

The readjustment device 20 may also be used as a parking brake by virtue of the screw spindles 12 being adjusted so as to clamp the brake pads 3, 3' against the brake disc 2 by way of the readjustment device 20 driven by the electromotive actuator 30. For this purpose, the electromotive actuator 30 is activated in a suitable manner by a brake control unit via the control unit 27. After the clamping of the brake pads 3, 3' in this way, the brake pads remain in their parking brake position by way of the wedge action of the support device 5, without hydraulic action. A reliable release is again realized by the correspondingly controlled electromotive actuator 30, wherein the simultaneous build-up of a hydraulic brake-application pressure in the brake-application pistons 10 by the pressure-boosting piston, that is to say stepped piston 32, causes the screw spindles 12 to be mechanically relieved of load, and thus permits an easy release of the spindles 12.

LIST OF REFERENCE NUMERALS

1 Disc Brake
2 Brake Disc
3, 3' Brake pad
4 Pad carrier
5 Support device
5a First support portion for brake-application force
5b Second support portion
5c Support portion for tangential force
6 Diverting lever
6a Lever force transfer portion
6b Shoulder
7 Force transmission unit
8 Pressure portion
9 Brake-application element
10 Brake-application piston
11 Brake-application cylinder
12 Screw spindle
12a Return spring
13 Screw spindle wheel
14 Readjustment pinion
15 Readjustment shaft
16 Readjustment shaft wheel
17 Readjustment drive wheel
18 Emergency release device
19 Gear motor
20 Readjustment device
21 Tangential force absorption cylinder
22 Stepped absorption piston
23 Plunger
23a Thrust plate
23b Readjustment piston
24 First pressure chamber
25 Second pressure chamber
26 Third pressure chamber
27 Control unit
28 Control drive
29 Control transmitter
30 Electromotive actuator (pump)
31 Distributor cylinder
32 Stepped piston
33 Admission pressure chamber
34, 34'High-pressure chamber
35 Inlet pressure chamber
36 Expansion vessel
37 Release valve
38 Switching valve
39 Suction valve
40 Brake caliper
40a Stop element
41 First pressure sensor
42 Second pressure sensor
43 Third pressure sensor
44 Hydraulic switch
45 Slide
46 Reservoir circuit
47 Intermediate circuit
48 Control drive return line
49 Control drive pressure line
50 Pump suction line
51 Pump pressure line
52 Gear motor pressure line
53 Hydraulic switch control line
54 High-pressure line
55 Intermediate lines
56 Connecting lines
57 Brake-application pressure chamber
58 Readjustment chamber
59 Directional valve
60 Shoulder element
61 Shoulder portion for brake-application force introduction
62 Shoulder portion for brake-application force transmission
63 Shoulder portion for brake-application force transfer
64 Rolling surface
65 Shoulder central portion
66 Roller element
67 Tooth portion
68 Tooth counterpart The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A self-energizing disc brake, comprising:
a brake-internal hydraulic arrangement with a reservoir circuit and an expansion vessel;
a brake-application device having at least one brake-application cylinder for the brake-application movement of at least one brake pad in the direction of a brake disc;
at least one force transmission unit which supports the at least one brake pad on the brake-application device at a wedge angle, the at least one force transmission unit having a diverting lever and shoulder element attached thereto;
at least one tangential force absorption cylinder for wedge angle switching, which tangential force absorption cylinder is operatively connected to the at least one force transmission unit;
an electromotive actuator which acts on the brake-application device via the hydraulic arrangement;
a control unit for controlling the wedge angle switching between the tangential force absorption cylinder and the electromotive actuator; and
a readjustment device having
an adjustable screw spindle operatively connected to the brake-application device and operatively coupled to the electromotive actuator in order to be driven to adjust a position of the at least one brake bad relative to the brake disc to compensate for brake pad wear, and
a readjustment piston hydraulically adjustable in the tangential force absorption cylinder, the readjustment piston being operatively configured to adjust a position of a stepped absorption piston in the tangential force absorption cylinder during adjustment of the position of the at least one brake pad by the adjustable screw spindle,
wherein
the diverting lever and the shoulder element have rolling surfaces which are in contact with respective corresponding rolling surfaces of a brake-application element of the at least one brake-application cylinder and of a support device of the brake pad, and
the diverting lever has a pressure portion with a rolling surface which is operatively connected to the at least one tangential force absorption cylinder.

2. The disc brake as claimed in claim 1, wherein the diverting lever has a force transfer portion and a shoulder operatively configured to cooperate with the support device to transfer brake application force between the diverting lever and the support device.

3. The disc brake as claimed in claim 2, wherein the force transmission unit comprises a roller element between the support device and the shoulder of the diverting lever.

4. The disc brake as claimed in claim 3, wherein braking force is transferred via the roller element between the shoulder of the diverting lever and a support portion of the support device.

5. The disc brake as claimed in claim 4, wherein at least one of:
the shoulder of the diverting lever has a planar or curved surface, and the support portion of the support device has a curved or planar surface.

6. The disc brake as claimed in claim 5, wherein the support portion of the support device includes a tooth portion operatively configured to cooperate with a corresponding surface of the diverting lever.

7. The disc brake as claimed in claim 6, wherein the shoulder of the diverting lever and the support portion of the support device are formed in regions of contact with the roller element with respective contours such that the roller element engages in sliding-free rolling over a full range of motion of the shoulder of the diverting lever and the support portion of the support device relative to one another.

8. The disc brake as claimed in claim 1, wherein the control unit is connected to the reservoir circuit and to an intermediate circuit, wherein the electromotive actuator is connected to the reservoir circuit via a suction valve and is connectable to the intermediate circuit by a switching valve when the switching valve is in a first position.

9. The disc brake as claimed in claim 8, wherein
the at least one tangential force absorption cylinder and the stepped absorption piston are configured to cooperate with one another to form a plurality of pressure chambers within the at least one tangential force absorption cylinder, the plurality of pressure chambers being selectively coupleable to one another to alter an effective wedge angle of the support device, and
the control unit is operatively configured to selectively couple the plurality of pressure chambers in the at least one tangential force absorption cylinder in a configuration that sets the effective wedge angle at a value closest to a wedge angle value corresponding to a present friction coefficient of the brake pad.

10. The disc brake as claimed in claim 9, wherein the control unit has a control disc rotatable via a hydraulic control drive, for the selective connection of the plurality of pressure chambers to the reservoir circuit and/or to the intermediate circuit.

11. The disc brake as claimed in claim 10, wherein the electromotive actuator is connectable to the hydraulic control drive of the control unit to control selection of the effective wedge angle when the switching valve is in a second position.

12. The disc brake as claimed in claim 11, wherein the electromotive actuator is operatively connected only to the control drive of the control unit for the duration of a braking operation.

13. The disc brake as claimed in claim 12, wherein the control disc is adjustable in response to a demand for a more intense brake application by the electromotive actuator and the control drive in the manner of operation of a proportional valve from the blocking position in the direction of increasing the effective wedge angle toward a supercritical wedge angle.

14. The disc brake as claimed in claim 12, wherein the control disc is adjustable in response to a demand for a less intense brake application by the electromotive actuator and the control drive in the manner of operation of a proportional valve from the blocking position in the direction of decreasing the effective wedge angle toward a subcritical wedge angle.

15. The disc brake as claimed in claim 11, wherein, during a switching process of the switching valve from a first position to the second position, a pump suction line of the electromotive actuator is blocked from a pump pressure line, such that no change in a brake-application position is possible during the switching process.

16. The disc brake as claimed in claim 11, wherein an electric motor of the electromotive actuator is switchable into a deenergized state during uniform braking when the switching valve is switched from the first position into the second position.

17. The disc brake as claimed in claim 10, wherein the control unit has further switching positions between each pair of adjacent hydraulic connections in which the plurality of pressure chambers and at least one of the connections to the reservoir circuit and/or to the intermediate circuit are shut-off such that a presently selected brake-application position cannot be varied.

18. The disc brake as claimed in claim 17, wherein,
during a period in which a brake-application position is constant, the control disc is in a blocking position at which the effective wedge angle is between a more supercritical wedge angle and a more subcritical wedge angle, and
in said blocking position the electromotive actuator is deenergized.

19. The disc brake as claimed in claim 10, wherein the selective connection of the plurality of pressure chambers to the reservoir circuit and/or to the intermediate circuit is switchable in seven stages by selecting a plurality of combinations of the plurality of pressure chambers in a manner that provides increasing effective piston surface area of the stepped absorption piston.

20. The disc brake as claimed in claim 8, wherein, when the switching valve is in the first position, a change in a brake-application movement occurs through adjustment of the electromotive actuator.

21. The disc brake as claimed in claim 1, wherein the diverting lever has a tooth portion operatively configured to cooperate with a correspondingly-shaped tooth counterpart of the brake-application element.

22. The disc brake as claimed in claim 21, wherein the tooth counterpart of the brake-application element is a separate component operatively configured to be attached to the brake-application element.

23. The disc brake as claimed in claim 21, wherein a pitch point at which sliding-free rolling of the tooth portion of the diverting lever with the tooth counterpart of the brake-application element occurs when the brake pad is located at a position corresponding to one third of a maximum tangential deflection of the brake pad.

24. The disc brake as claimed in claim 1, wherein the at least one brake-application cylinder includes two or more brake-application cylinders,
further comprising a distributor cylinder arranged in series between the electromotive actuator and the two or more brake-application devices, the distributor cylinder being operatively configured to provide for parallel, tilt-free actuation of the at least one brake pad and simultaneous selective pressure boosting.

25. The disc brake as claimed in claim 1, wherein the shoulder element is connected to the diverting lever by an elastic fastening comprising a screw connection with a plate spring.

26. The disc brake as claimed in claim 1, wherein the shoulder element has portions operatively configured to cooperate with the brake-application cylinder and the support device of the brake pad for transfer of brake application force.

27. The disc brake as claimed in claim 1, wherein the shoulder element has a narrowed portion between adjacent load-bearing portions of the shoulder element, the narrow portion being operatively configured to provide for elastic deformation of the rolling surface of the shoulder element with respect to the rolling surface of the brake-application element.

28. The disc brake as claimed in claim 1, wherein the brake-internal hydraulic arrangement has a release valve operatively configured to generate a through-connection between the electromotive actuator and the reservoir circuit in a deenergized state to release the brake.

* * * * *